J. L. BEASLEY.
AUTOMOBILE MOWER.
APPLICATION FILED SEPT. 24, 1917.

1,274,499.

Patented Aug. 6, 1918.
3 SHEETS—SHEET 1.

Witness

Inventor
J. L. Beasley
By C. A. Snow & Co.
Attorneys

J. L. BEASLEY.
AUTOMOBILE MOWER.
APPLICATION FILED SEPT. 24, 1917.

1,274,499.

Patented Aug. 6, 1918.
3 SHEETS—SHEET 2.

J. L. Beasley, Inventor,

By C. A. Snow & Co.
Attorneys

Witness
J. R. Towler
H. A. Mitchell

UNITED STATES PATENT OFFICE.

JOHN L. BEASLEY, OF MEMPHIS, TENNESSEE.

AUTOMOBILE MOWER.

1,274,499.　　　　Specification of Letters Patent.　　Patented Aug. 6, 1918.

Application filed September 24, 1917. Serial No. 192,995.

*To all whom it may concern:*

Be it known that I, JOHN L. BEASLEY, a citizen of the United States, residing at Memphis, in the county of Shelby and State of Tennessee, have invented a new and useful Automobile Mower, of which the following is a specification.

The subject of this invention is an automobile mower, and the objects of the invention are, first, to provide a mower attachment for automobiles, second, to provide means for driving the mower knife, third, to provide means for suspending the attachment from an automobile, fourth, to provide means for elevating the cutter bar and knife when not in use, fifth, to provide means for supporting the cutter bar and knife in lower and in elevated positions, sixth, to provide a simple and efficient automobile mower.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

A practical embodiment of the invention is shown in the accompanying drawings, wherein:—

Figure 1:
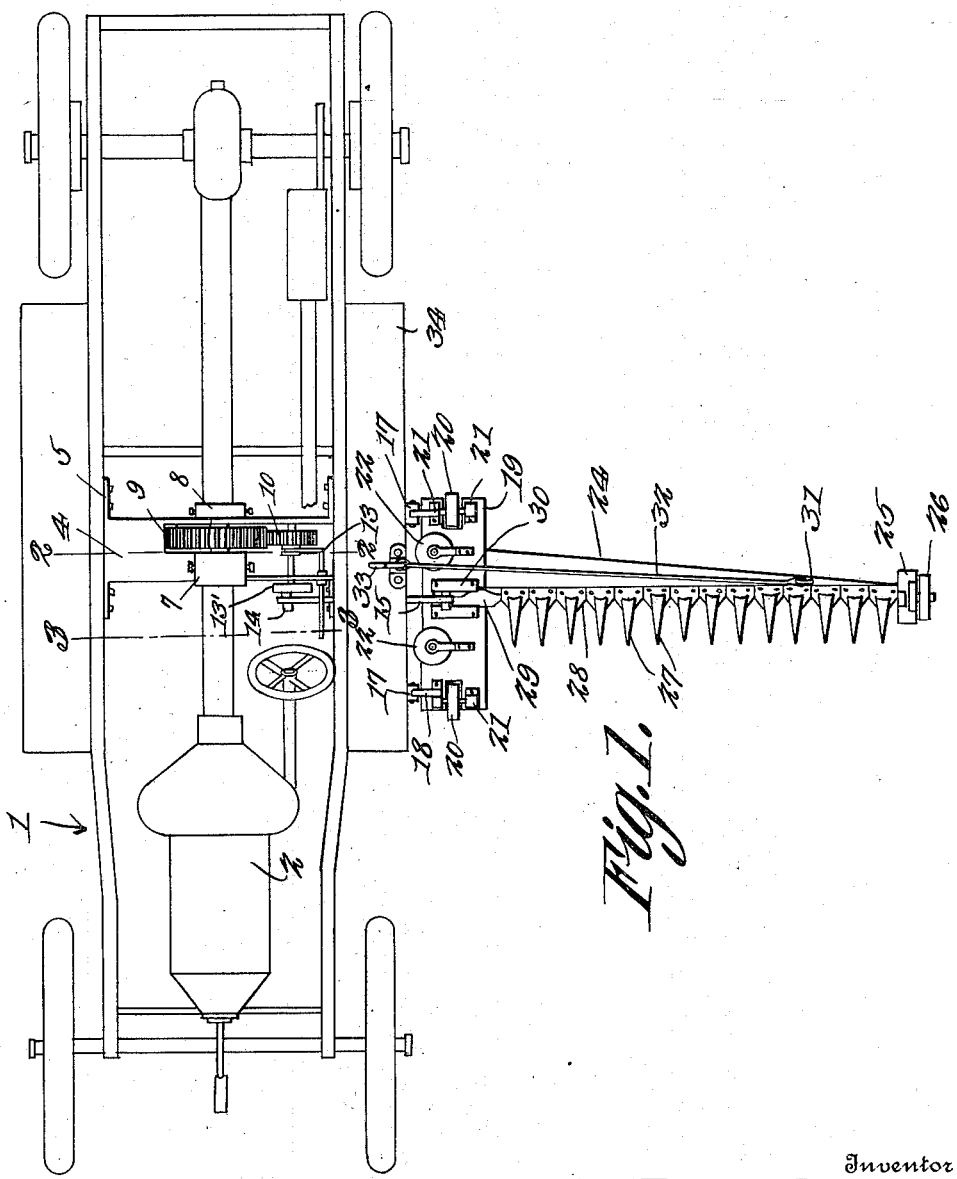
Figure 1 is a plan view of an automobile mower constructed in accordance with this invention, the automobile body removed.
Figure 2:
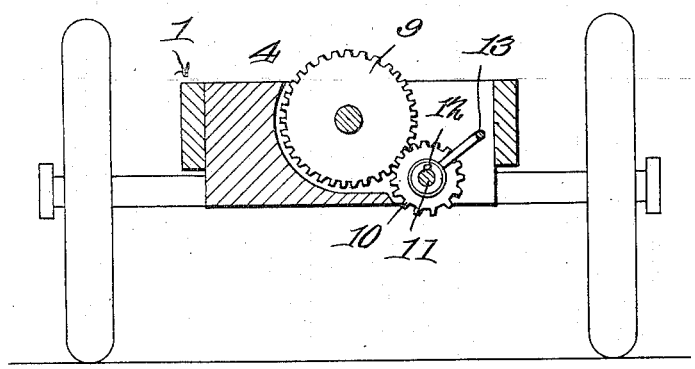
Fig. 2 is a cross section on the line 2—2 of Fig. 1.

Referring to the drawings by numerals of reference:

The chassis of an automobile is indicated at 1, on which is mounted a motor, indicated conventionally at 2. A drive shaft extends longitudinally of the chassis and is housed in a tubing or casing 3.

A formed supporting bracket 4, having an irregular opening as shown, has angularly disposed lugs 5 at each end through which it is attached to the side bars of the chassis by means of bolts 6 or otherwise.

Figure 4:
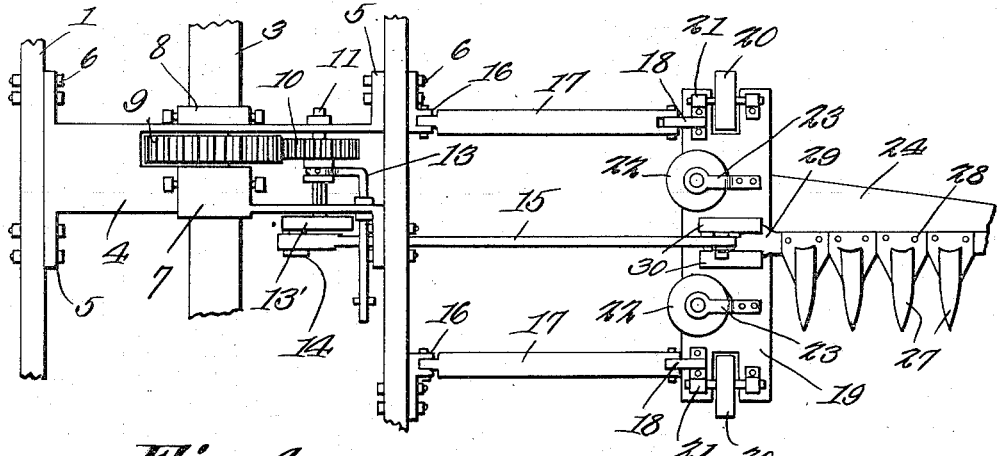
Fig. 4 is an enlarged detail plan view of the operating mechanism and main cutter bar support, a portion being in section.
Figure 5:
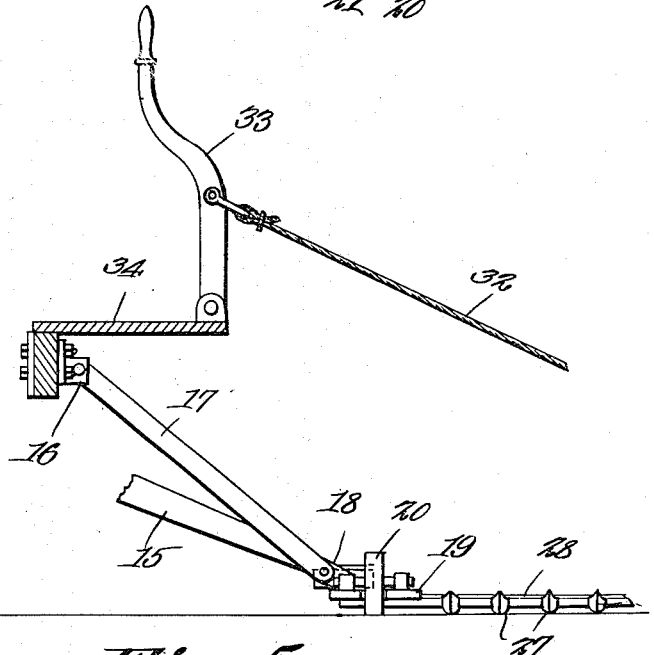
Fig. 5 is a detail view in elevation of the cutter bar elevating means.

Hubs 7 and 8 are formed at the front and rear faces respectively, of the bracket 4 and are adapted to receive the shaft casing 3, a section of which casing is removed at this point, as seen most clearly in Fig. 4. The ends of the casing 3 are bound within the hubs by means of set screws or otherwise.

Rigid on the drive shaft, and positioned within the reduced portion of the opening in the bracket 4, is a gear wheel 9 which meshes with a small gear 10 which slides on a shaft 11. The shaft 11 is journaled in the bracket 4, and has a keyway 12 formed therein and adapted to receive a key formed on the gear 10. A lever rod 13 is actuated in the usual way to throw the gear, and extends to the operator's seat or other convenient location. The forward end of the shaft 11 projects beyond the front face of the bracket 4 and on this end is secured a wrist plate 13′ provided with a wrist pin 14 which pivotally engages one end of a pitman 15.

Secured to the outer face of one side bar of the chassis 1 are spaced brackets 16 to each of which is pivotally secured one end of the hanger bars or supports 17. Each hanger bar 17 is preferably reduced at its upper end, as shown, to form a tongue which has pivotal connection with the bracket 16, while the lower end of each hanger 17 is bifurcated to embrace a lug 18 to which it is pivotally secured.

Figure 3:
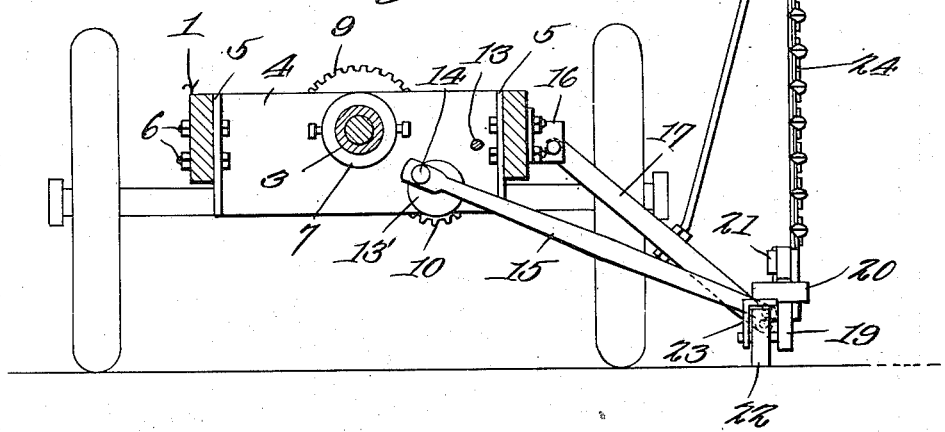
Fig. 3 is a section on the line 3—3 of Fig. 1.

The lugs 18 are fastened by bolts or otherwise to a supporting plate 19 which is apertured at each end to receive rollers 20. The pins or shafts of the rollers 20 are journaled in suitable blocks 21 which are secured to the plate 19 in any convenient manner, and are preferably integral with the lugs 18. Wheels or rollers 22 are also provided which normally lie above the plate 19, as shown most clearly in Fig. 1, and which are adapted to contact the ground and support the parts when the plate is turned to vertical position, as will be clearly apparent from an inspection of Fig. 3. These wheels 22 are suitably journaled in the plate 19 and brackets 23, which are secured to the plate.

Secured to the supporting plate 19 is a cutter bar 24 to the outer end of which is attached a plate 25 to which a supporting wheel or roller 26 is pivotally secured. The cutter bar has the usual series of fingers 27 riveted or otherwise secured thereto, and supports a reciprocating cutter blade 28 in the usual manner.

The blade 28 is provided with a head 29 which slides in guide blocks 30 secured to the supporting plate 19. The head 29 may be of any of the usual formations to pivotally engage the outer end of the pitman 15.

An eye bolt 31 is secured to the cutter bar and to the eye may be attached one end of a cable 32 the other end of which is secured to a lever 33 which is pivotally mounted on the running board 34 of the automobile. The lever 33 is thrown to raise or lower the cutter bar in passing obstructions such as stumps of trees, large rocks and the like.

Having thus described the invention, what is claimed as new and sought by Letter Patent, is:—

An automobile mower embodying, in combination with an automobile chassis, including a motor, a drive shaft, and a casing for the shaft, a bracket detachably secured within the chassis, hubs on the bracket for the reception of the casing, means for binding the casing within the hubs, a gear wheel on the drive shaft within the bracket and between the hubs, a counter shaft journaled in the bracket, a gear wheel feathered on the countershaft and adapted to mesh with the first mentioned gear wheel, a wrist plate on the counter shaft, hangers secured to the chassis, a mower blade supported by the hangers, and a pitman connected to the mower blade and the wrist plate.

In testimony that I claim the foregoing as my own, I have hereto affixed my signature in the presence of two witnesses.

JOHN L. BEASLEY.

Witnesses:
   MILTON G. DILLON,
   CLAUDE R. BRIGGS.